May 2, 1950     J. E. FINNERAN, JR., ET AL     2,506,353
COURSE INDICATING AND MARKING APPARATUS FOR AIRCRAFT
Filed Aug. 30, 1944     2 Sheets-Sheet 1

Inventors
James E. Finneran Jr. &
Harry C. Stites

By H. D. McDowell
Attorney

May 2, 1950      J. E. FINNERAN, JR., ET AL      2,506,353
COURSE INDICATING AND MARKING APPARATUS FOR AIRCRAFT
Filed Aug. 30, 1944      2 Sheets-Sheet 2
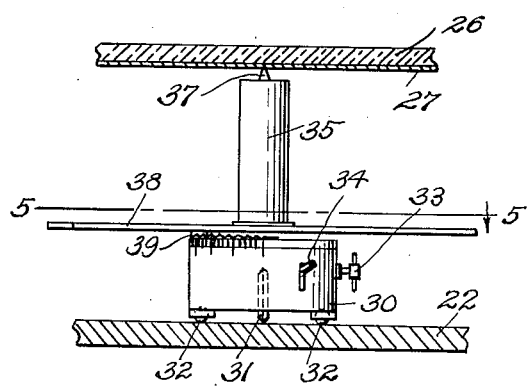
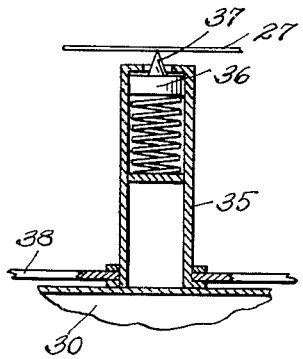
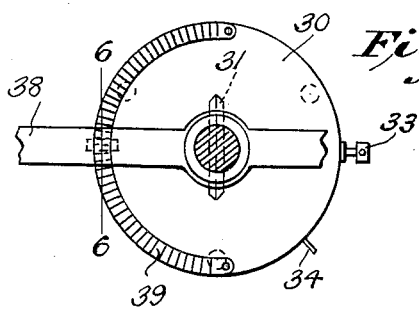
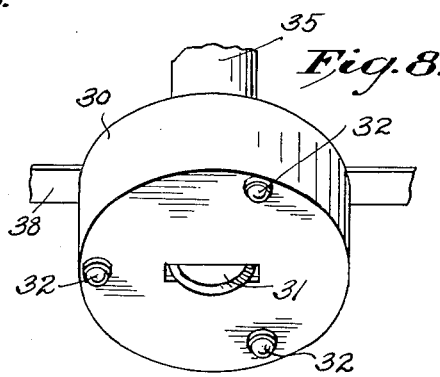
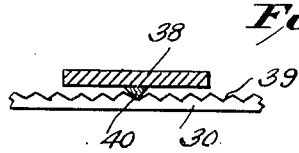
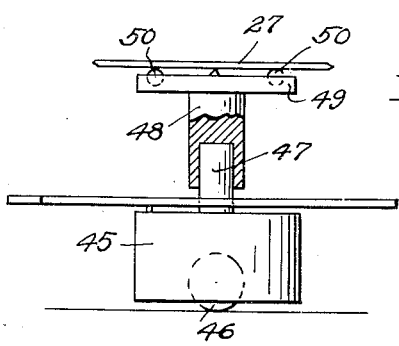
Inventors
James E. Finneran Jr. &
Harry C. Stites
By W. D. McDowell
Attorney Patented May 2, 1950

2,506,353

UNITED STATES PATENT OFFICE 2,506,353

COURSE INDICATING AND MARKING APPARATUS FOR AIRCRAFT

James Edward Finneran, Jr., and Harry Clifford Stites, Columbus, Ohio

Application August 30, 1944, Serial No. 551,958

2 Claims. (Cl. 33—1)

This invention relates to aero-navigational apparatus and, more particularly, to an improved course-recording and indicating mechanism, the object of the invention being to provide mechanism adapted for employment in airplanes to aid the pilot in determining conveniently and with reasonable accuracy the course pursued by the airplane at any time during its flight between two given geographical positions.

In civilian aviation particularly, a pilot in flying over unfamiliar terrain or under adverse weather conditions, is often at a loss to know with reasonable certainty his true geographical position. While most airplanes are provided with compasses, engine tachometers and the like, the effective use thereof in determining positions requires considerable calculation even on the part of highly experienced pilots. Therfore, it is another object of the invention to provide a course-recording and indicating mechanism which, during airplane flight, will record automatically (or otherwise indicate) on an associated map or chart the course being followed by the airplane, so that the pilot, by mere visual inspection of the map or chart, will be informed as to the true land reference position of the airplane.

A further object is to provide an airplane course recorder or indicator in which a motor-actuated stylus carrier is disposed for timed movement on and over a horizontally maintained base surface having associated therewith a magnetic north-seeking needle by which its operating positions are automatically controlled, the stylus of the carrier being held in recording contact with the surface of a map or chart supported by the mechanism in spaced parallel relationship with the base surface, whereby during flight a line is drawn by the stylus on the map or chart, disclosing to the pilot the position of the airplane during flight thereof between two geographical positions.

It is a further object of the invention to provide apparatus of this nature which is simple and easy to read, understand and operate, so that the same may be employed successfully by relatively inexperienced as well as experienced pilots.

For a further understanding of the invention, reference is to be had to the following description and the accompanying drawings, wherein:

Fig. 4 is an enlarged side elevational view of the motor-actuated needle and stylus carrier;

Fig. 5 is a horizontal sectional view on the line 5—5 of Fig. 4;

Fig. 6 is a similar view on the line 6—6 of Fig. 5;

Fig. 7 is a detail vertical sectional view taken through the stylus;

Fig. 8 is a detail perspective view of the carrier;

Fig. 9 is a detail vertical sectional view disclosing a slightly modified form of carrier.

Figure 1:
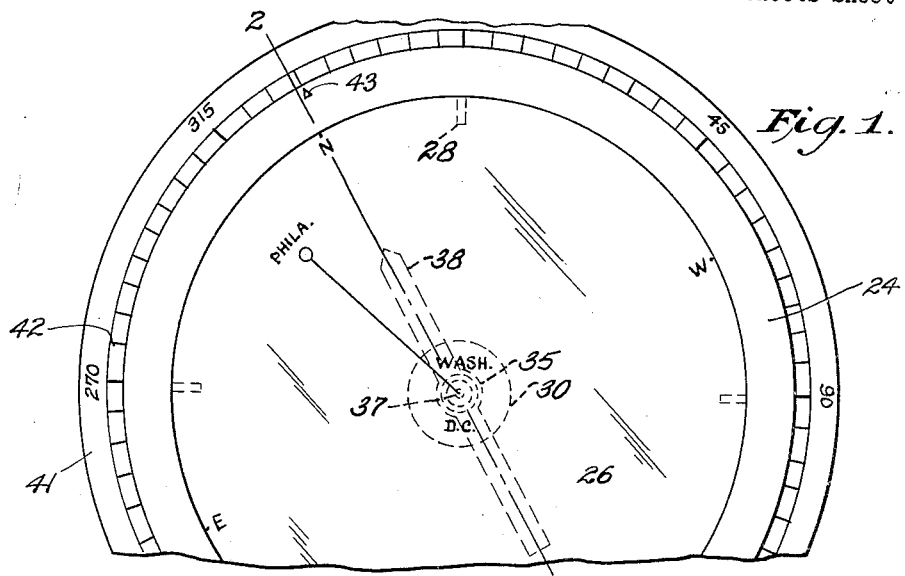
Fig. 1 is a fragmentary plan view of the improved aero-navigational apparatus comprising the present invention.

Referring more particularly to the drawings, our improved aero-navigational instrument is formed to include a casing 10 adapted to be suitably supported in any stationary manner in connection with an airplane's fuselage adjacent to the pilot's position. The casing is adapted to contain a liquid, indicated at 11, having a low-freezing point. The top of the casing is formed with an opening 12 through which projects the upper part of a hollow level-maintaining globe 13, the bottom of the latter being weighted, as at 14. Around the opening 12, the casing 10 carries an annular flexible gasket or sealing member 15, which serves to maintain the liquid within the casing but to provide for rocking movement of the globe 13, the sealing member being formed with a downwardly projecting flanged portion 16 which embraces the spherical outer surfaces of the globe, the latter being buoyantly supported in the body of liquid 11 for limited universal movement. To stabilize the movement of the globe, the latter is provided with externally disposed radially projecting pins 17, which are loosely received within U-shaped guides 18 fixed to the inner walls of the casing 10.

The upper portion of the globe 13 terminates in a stem 19 disposed above the top of the casing 10, and this stem carries a frame 20 in which is removably and rotatably positioned, for turning movement about the vertical axis of the frame 20 the circular lower section of a chart housing. The lower or base section of the housing comprises a flat and normally horizontally disposed bottom wall 22 and an upstanding circular side wall 23. The open top of the housing is normally closed by means of a lid 24, which is hinged as at 25 to the wall 23. The lid 24 carries a glass or other transparent plate 26, against the under surface of which there is removably placed a chart or map 27 preferably in the form of a thin transparency, and which has printed or otherwise designated thereon geographical positions showing the area adjacent the general course which the airplane is to pursue. These charts are readily interchangeable and, by way of example, may disclose geographical locations within a radius of 250 miles of main centers of population, as from Washington, D. C. to Philadelphia, Pennsylvania.

If the course to be flown is of greater length than the limits afforded by any one chart, another chart or charts is substituted for the first chart in which, for example, Philadelphia, Pennsylvania will be located as a starting point in the center of the chart with other geographical positions around its borders, as New York, New York. The charts are maintained in a flat and taut condition against the under side of the plate 26 by means of spring clips 28 or their equivalents.

Receivable within the base section of the housing and movable on the horizontal and flat upper surface of its bottom wall 22 is a motor actuated stylus carrier. This carrier comprises a base 30 in which is mounted a spring actuated clock motor, not shown, of any standard construction, the motor driving a propelling wheel 31, the peripheral portion of which is tapered so that it will have virtual point engagement with the upper surface of the housing wall 22. The under part of the base 30 also carries, as shown in Fig. 8, antifriction balls 32 which have rolling engagement with the upper surface of the wall 22. The spring motor in the base may be wound by the manual control indicated at 33 (Figs. 4 and 5) so that when the motor is wound, energy will be imparted to the wheel 31 to effect its rotation and cause the linear advance of the carrier across the upper surface of the wall 22 in a direction selected by the pilot when the carrier is placed within the housing. The spring motor is provided with a manually adjustable speed regulator 34 so that the linear advance of the carrier may be varied in relation to a given period of time.

For example, assuming that the plane on which the instrument is carried flies normally at a speed of 100 land miles per hour, the motor of the carrier may be adjusted so that the carrier will advance linearly relative to the map or chart at one inch per hour. If the plane is flying in the face of a head wind, the speed of the carrier motor may be somewhat retarded in a manner proportioned to the advancing linear speed of the plane and, conversely, if the plane is flying with the advantage of a tail wind, the speed of the carrier motor may be increased to correspond with the increased speed of the airplane.

The carrier is provided with an upstanding barrel 35 in which is slidably positioned a spring-pressed circular base member 36 which terminates in an outwardly projecting stylus 37 to which ink or other marking fluid is fed by capillary attraction, producing a line on the under surface of the chart 27. The stem carries a highly sensitive magnetic needle 38 which is adjustable with respect to the base of the carrier. Thus, the upper surface of the carrier base may be formed with teeth 39 arranged in arcuate order, as shown in Fig. 5. The needle 38 has formed therewith a V-shaped projection 40 which is adapted to be resiliently seated between any two adjacent teeth 39, in order that the carrier may be turned in unison with deflections of the magnetic needle in seeking the north in response to changes in direction of the forward advance of the airplane.

Figure 2:
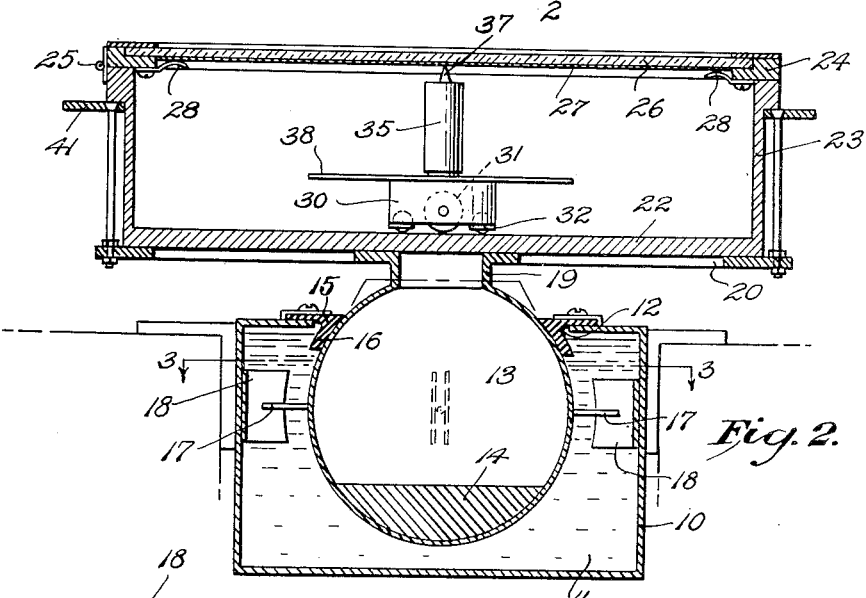
Fig. 2 is a vertical sectional view taken through the apparatus on the plane indicated by the line 2—2 of Fig. 1.
Figure 3:
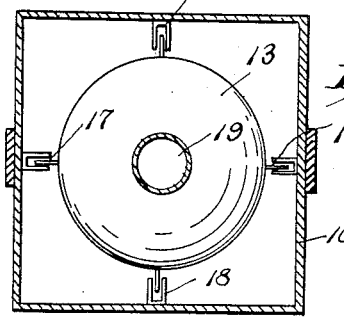
Fig. 3 is a horizontal sectional view on the plane indicated by the line 3—3 of Fig. 2.

In the use of the instrument, assuming that an airplane pilot intends to fly a course between Washington, D. C. and Philadelphia, Pennsylvania, the pilot advantageously draws on the chart 27 by a protractor a straight line from the starting position, Washington, D. C., to the terminal point of the destination, which it will be assumed is Philadelphia, Pennsylvania. The chart is then placed on the inside of the lid or cover 24, being held in position by the prongs or clips 28. Before closing the lid, the carrier is placed in a central position on the bottom wall 22 of the chart housing with the stylus point 37 in position to register with the starting point designation on the chart when the lid is closed. Concurrently with the winding of the spring motor, the magnetic needle is positioned so that it points to the magnetic north, but the base of the carrier may be adjusted relative to the magnetic needle so that the vertical plane passing through the traction wheel 31 will register with the course indication on the chart. The lid is then closed so that it will assume the position disclosed in Fig. 2, the sylus point engaging with the starting position on the chart.

As the plane proceeds on its course, the stylus point follows the course route drawn on the map or chart. If the plane should deviate to the right or left of the straight line course drawn on the chart and which the plane should follow, the carrier, influenced by the action of the magnetic needle, moves the stylus away from the course route, thus showing the pilot at a glance the position of the plane with relation to the straight course. The stylus is viewable as a result of the transparency of the plate 26 and the member 27 and, therefore, the stylus need not produce a drawn course line on the chart but merely may serve as an indicator.

It will be evident that the chart housing will be maintained in a truly horizontal plane irrespective of lateral or longitudinal tilting movement of the airplane fuselage as normally occurs during flight, thus enabling the carrier to pursue its set course of travel. The frame 20, in which the housing is rotatably supported, terminates at its upper end in a horizontally and outwardly directed flange 41 which may be provided on its upper surface with the degree graduations 42 of a circle. These graduations register with a pointer index 43 on the housing, so that the housing may be rotated with respect to the frame in order to compensate in an approximate manner for the effects of cross winds.

From the foregoing, it will be seen that the present invention provides an aero-navigational instrument adapted for use by amateur aviators, as well as by professional or other experienced pilots, in determining land positions at any time during flight of an airplane between two or more points. It is contemplated that maps or charts will be produced for each city or other population center, so that if a plane is to be flown for a considerable distance, in which the proposed flight is beyond the boundaries of a given chart, it will be convenient to insert another continuing chart in place of the first one, thus extending the course of flight as desired. It is preferable that these charts should be formed from thin sheets of treated transparent paper, so that the stylus and carrier will be viewable therethrough.

Due to the operational characteristics of the instrument, it is necessary in printing the charts to reverse the ordinary east and west designations from those normally appearing on conventional maps or charts, east being at the left of the chart and west at the right, as the chart is viewed in top plan, as in Fig. 1.

While we have described our invention as being particularly useful for airplane navigation, it will be understood that the instrument may also be employed in connection with water craft with equal facility.

The interior of the housing may be illuminated in any suitable manner if so desired.

In the modified form of the invention disclosed in Fig. 9, the stylus carrier is formed with a casing 45 containing the spring motor, the latter driving the traction wheel 46, as previously described. The casing 45 includes an upstanding stem 47 on which is rotatably fitted the lower socketed end of a stylus shown at 48. The stylus carries at its upper end a disk 49 which contains the rotatable antifriction balls 50, the latter having engagement with the under surface of the chart 27 held in the lid of the housing.

Other variations may be made, of course, in the construction of the instrument without departing from the scope of the following claims.

We claim:

1. An aero-navigational instrument comprising a base member having a flat horizontally disposed table surface, means for mounting said base member upon an airplane in a manner to maintain the horizontal level of said table surface irrespective of airplane flight conditions tending to change such level, a dirigible stylus carrier disposed on said surface for travel thereover in any radial course from the center thereof, motor driven means for imparting a timed rate of travel to said carrier, a magnetic needle joined with said carrier to maintain the latter in a set course of linear travel radially across said base member, and means disposed above the plane of said base member surface to support a substantially transparent map or chart in stationary, parallel and horizontal relationship with said surface and in engagement with the stylus of said carrier.

2. An aero-navigational instrument comprising a base structure having a flat operating surface normally maintained in a horizontal plane, a movable indicator adapted to be arranged over said surface for travel thereabove, a portable base for said indicator, motor driven means engaging said operating surface and carried by said base for imparting timed movement to the indicator, the latter being free of direct mechanical connection with said base structure so that it may move in any radial course of travel over said operating surface, adjustable means joined with said indicator responsive to the magnetic field of the earth to maintain said indicator in a given course of radial travel over said operating surface, and means disposed above said operating surface and carried by said base structure to support a substantially transparent map or chart in stationary, spaced, parallel and horizontal relationship to said operating surface and in position-denoting registration with said indicator.

JAMES EDWARD FINNERAN, Jr.
HARRY CLIFFORD STITES.

REFERENCES CITED

The following references are of record in the file of this patent:

UNITED STATES PATENTS

| Number | Name | Date |
|---|---|---|
| 734,064 | Hedenstrom | July 21, 1903 |
| 903,711 | Hallwood | Nov. 10, 1908 |
| 1,201,139 | Bodde et al. | Oct. 10, 1916 |
| 1,310,201 | Maxim | July 15, 1919 |
| 1,337,168 | Uttmark | Apr. 13, 1920 |
| 1,380,768 | Buckle et al. | June 7, 1921 |
| 1,433,595 | Baule | Oct. 31, 1922 |
| 1,464,943 | Vlemme | Aug. 14, 1923 |
| 1,701,582 | Mengden | Feb. 12, 1929 |
| 1,746,420 | Fung | Feb. 11, 1930 |
| 1,985,265 | Smith | Dec. 25, 1934 |
| 2,069,285 | Stark | Feb. 2, 1937 |
| 2,109,283 | Boykow | Feb. 22, 1938 |
| 2,118,559 | Hohmann | May 24, 1938 |
| 2,178,623 | Carter | Nov. 7, 1939 |
| 2,179,663 | Link | Nov. 14, 1939 |
| 2,267,649 | Graves | Dec. 23, 1941 |
| 2,283,190 | Crane | May 19, 1942 |
| 2,314,497 | Hargrave et al. | Mar. 23, 1943 |
| 2,369,922 | Shamah | Feb. 20, 1945 |

FOREIGN PATENTS

| Number | Country | Date |
|---|---|---|
| 361,696 | Germany | Oct. 17, 1922 |
| 555,663 | Great Britain | Sept. 1, 1943 |